March 17, 1959

L. B. MONOSMITH 2,877,536

TOOLING FOR A LATHE

Filed July 16, 1954

Inventor
Leroy B. Monosmith
By Schroeder, Hofgren,
Brady & Wegner
Atty's

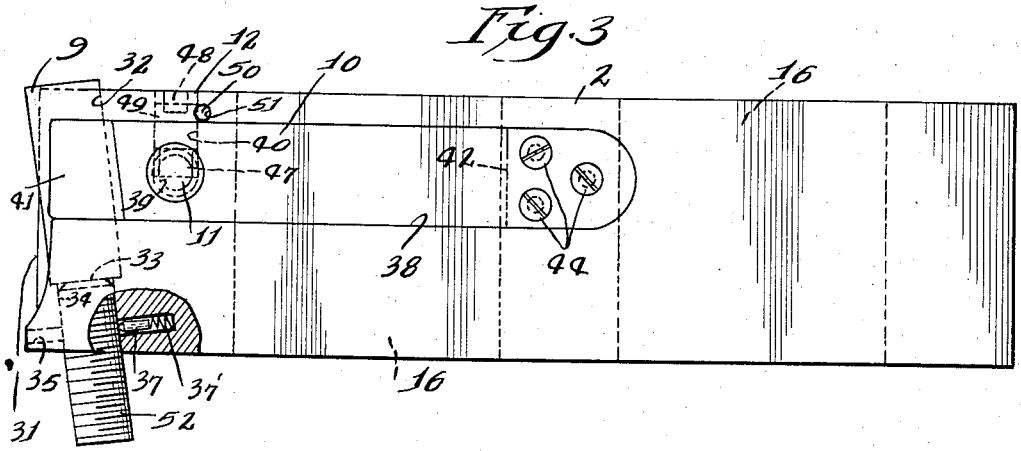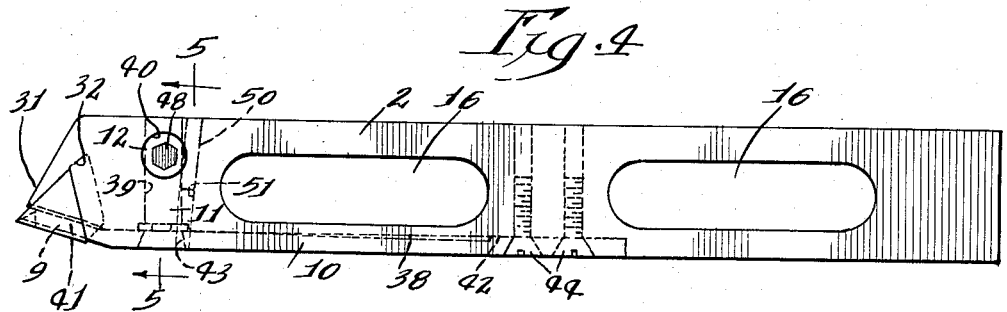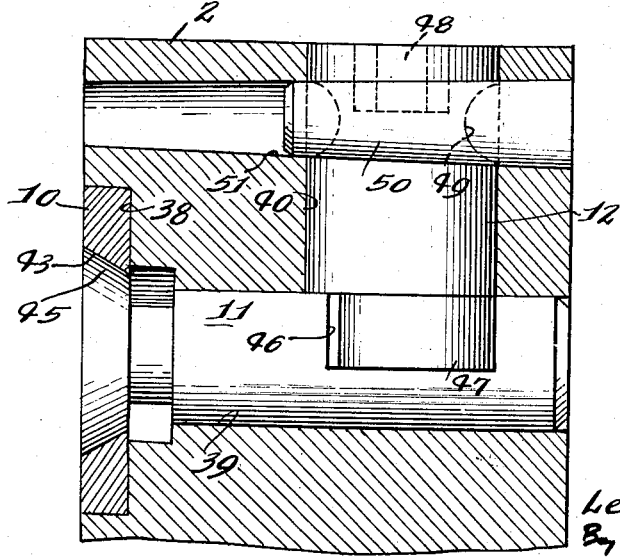

United States Patent Office 2,877,536
Patented Mar. 17, 1959

2,877,536

TOOLING FOR A LATHE

Leroy B. Monosmith, Rockford, Ill., assignor to Sundstrand Machine Tool Co., a corporation of Illinois Application July 16, 1954, Serial No. 443,734

3 Claims. (Cl. 29—97)

This invention relates to tooling for multiple cut lathes. The general object of this invention is to provide a new and improved means for holding and positioning cutting tools for lathe operations.

One of the objects of this invention is to provide a more convenient means for positioning and repositioning cutting tools for succeeding lathe operations by providing a new and improved tool holder adjustably carrying a tool bit and having means allowing it to be independently fastened to a plate fixedly mounted on the cross slide, so that a number of these tool holders may be arranged in any desired grouping or angular relation.

Another object of this invention is to provide a new and improved tool holder having means allowing an improved method of positioning and repositioning said tool holder on a cross slide of a lathe, and means for attaching it thereto, a tool bit being spring clamped in said tool holder by means of a lock pin and a cam pin.

Another object of this invention is to provide a means for more conveniently positioning and holding cutting tools for turning and facing lathe operations consisting of a tool holder bearing plate mounted on a cross slide and a plurality of new and improved tool holders fastened to this bearing plate, which tool holders may easily be independently positioned and repositioned for succeeding lathe operations by loosening two individual bolts for each tool holder.

A more particular object of this invention is to provide a means for positioning a plurality of cutting tools for numerous short run lathe operations in a convenient manner, said means comprising a tool holder bearing plate mounted on a lathe cross slide, and a plurality of tool holders having two vertical elongated slots extending the entire depth of said holders, operable to receive threaded bolts which freely pass down through the slots, the bolts being received by T-shaped tapped members which are slidably fitted into mating T-slots in the tool holder bearing plate, said T-slots extending the length of the plate parallel to the axis of a workpiece in the lathe, whereby the tool holders may have a universal movement allowing arrangement in any desired grouping or angular relation.

Other objects and advantages will become apparent from the following detailed description taken in connection with the accompanying drawing, in which:

Fig. 3 is a side elevational view of a single tool holder with a section broken away to better show a detent pin locking means;

Fig. 4 is a plan view thereof;

Fig. 5 is an enlarged transverse sectional view taken on the line 5—5 of Fig. 4.

While the invention herein desclosed is a preferred embodiment, it is not intended to limit the invention to the specific form and arrangements shown, it being contemplated that various changes may be made by those skilled in the art without departing from the spirit and scope of the appended claims.

Figure 1:
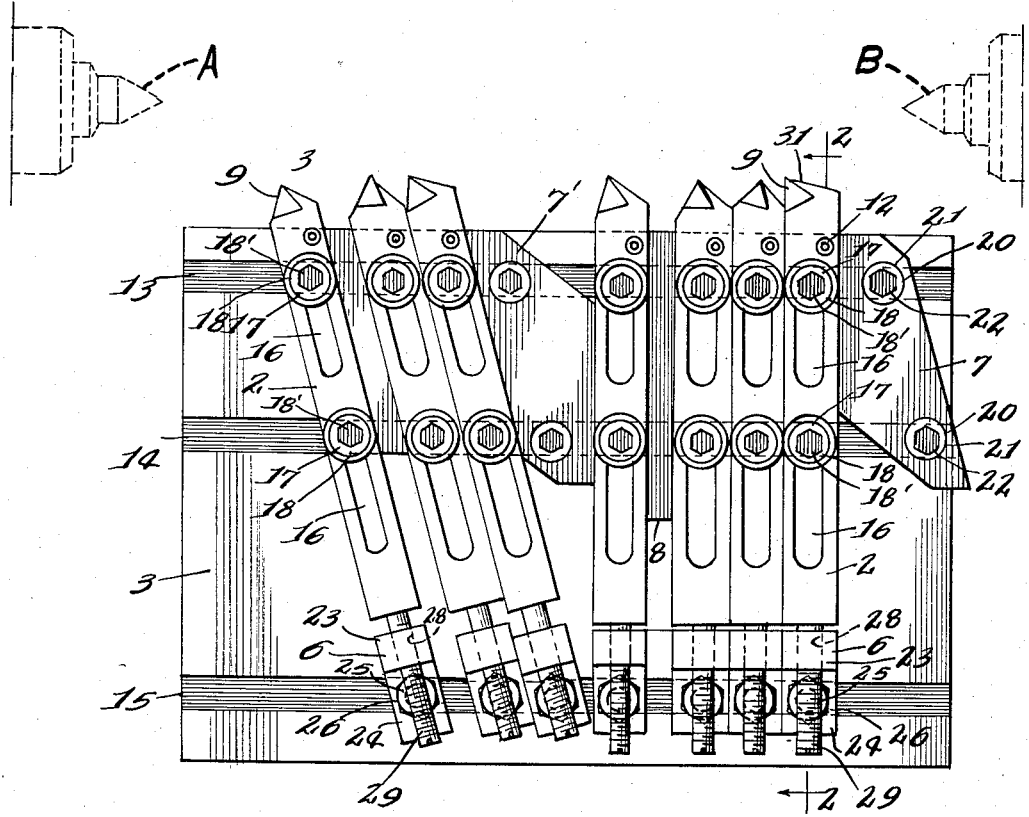
Fig. 1 is a plan view of a preferred form of the invention in which a plurality of tool holders are shown in a typical arrangement for a cutting operation on a workpiece mounted between lathe centers (shown by dotted lines) together with appropriate side stops, back stops, and spacers.

In Fig. 1 a plurality of tool holders 2 are shown adjustably fastened to a tool holder bearing plate 3 which is fastened to the cross slide 4 (Fig. 2) of a lathe by suitable means, as bolts 5. Back stop members 6, side stop members 7, and a spacer member 8 may be provided as shown in Fig. 1. In Figs. 3 and 4 is shown a tool holder 2 with a tool bit 9 held in position by spring clamp 10 which is cam-locked in place by a lock pin 11 and a cam pin 12.

More specifically, as shown in Fig. 1, tool holder bearing plate 3 has formed in it three T-slots 13, 14 and 15 which are parallel to each other and to the axis of a workpiece (not shown) mounted between lathe centers A and B, as shown diagrammatically, and extend the length of plate 3. T-slots 13 and 15 are each adjacent to an edge of plate 3, with T-slot 14 located between them but somewhat nearer to T-slot 13.

Each tool holder 2 is in the form of a rectangular bar positioned on edge against plate 3 and has two elongated vertical through slots 16 extending over a substantial portion of the length of the tool holder. Bolts 17 are provided to freely pass downwardly through each of said slots and have heads 18 provided with recessed portions 18' adapted to receive a hand wrench. The lower portion of each bolt carries a T-shaped nut member 19 slidably and nonrotatably fitted in one of the T-slots 13 and 14, so that the tool holders 2 may be easily clamped to tool holder bearing plate 3.

To aid in parallel spacing of adjacent tool holders, spacers 8 may be positioned therebetween as shown in Fig. 1. Side stop members 7 provide further stabilization and may also be used as spacers, as side stop member 7' in Fig. 1. These side stop members are polygon-shaped and each has two vertical through bores 20 each adapted to receive a bolt 21 passing downwardly therethrough. Bolts 21 have head portions 22 engageable with the top surface of the side stops and lower portions carrying T-shaped nut members slidably fitted in the T-slots 13 and 14. Bores 20 are preferably positioned so that there will be one side of a side stop 7 at right angles to the T-slots in plate 3.

Figure 2:
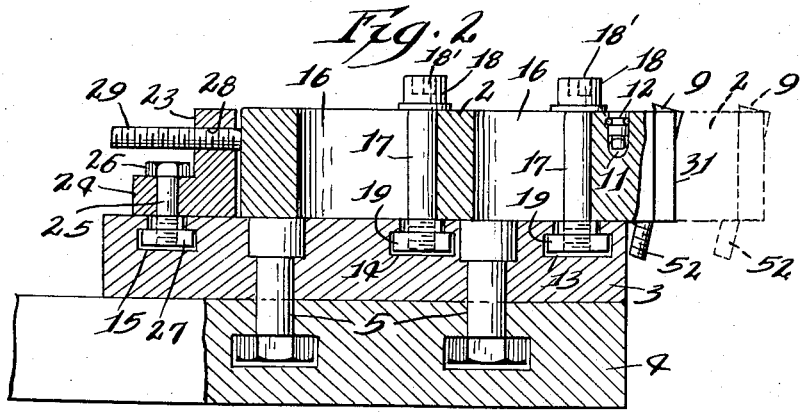
Fig. 2 is a transverse sectional view taken on the line 2—2 of Fig. 1.

T-slot 15 is used for fastening back stops 6 to plate 3. Each back stop 6 is an L shaped member having a vertical portion 23 and a horizontal portion 24, as best shown in Fig. 2. Horizontal portion 24 has a single bore adapted to receive a bolt 25 having a head 26 engageable with the top surface of horizontal portion 24 and a lower portion threadably received by a T-shaped nut member 27 slidably and nonrotatably fitted in T-slot 15 for tightening backstop 6 to plate 3. The vertical portion 23 has a horizontal threaded bore 28 adapted to receive an adjusting screw 29 for lateral adjustment of a tool holder 2 by direct engagement therewith.

Figs. 3, 4 and 5 show in more detail means for clamping a tool bit 9 in a tool holder 2. One end 31 of tool holder 2 is generally pointed as shown best in Fig. 4 and has an inclined V-shaped recess 32, extending a substantial portion of the depth thereof and adapted to receive a tool bit 9 of triangular cross section. Extending from the bottom surface 33 of recess 32 is a tapped bore 34 adapted to receive a threaded member 52 for vertical adjustment of tool bit 9. Intersecting bore 34 at a right angle is a smaller bore 35 adapted to receive a detent pin 37 urged toward the threads of member 52 by a spring 37', member 52 thereby being held in adjustment, as shown in the broken away portion of Fig. 3.

Extending along one side of tool holder 2 from the open side of recess 32 to approximately the midpoint of tool holder 2 is a horizontal rectangular groove 38. Extending from horizontal groove 38 at a point near vertical recess 32 through the width of tool holder 2 is a horizontal bore 39. A vertical bore 40 extends downwardly from the top surface of tool holder 2 and is positioned so as to intersect horizontal bore 39.

A spring clamp 10 in the form of a rectangular plate is shown having one end 41 angled slightly inwardly and, on its inner surface when mounted, a slightly raised portion 42 at its other end. Spring clamp 10 is adapted to fit in horizontal groove 38 with raised end portion 42 being secured to tool holder 2, as by screws 44 in Figs. 3 and 4, so as to allow an adequate spring action. When thus secured, a bevelled hole 43 in spring clamp 10 registers with horizontal bore 39 with angled end portion 41 fitting over the open side of V-shaped inclined recess 32. Adapted to pass through bevelled hole 43 and into horizontal bore 39 is a cylindrical lock pin 11 having a bevelled head 45 engageable with the sides of bevelled hole 43. Lock pin 11 has a rectangular slot 46 in its upper portion transverse to the axis thereof.

A cylindrical cam pin 12 is adapted to rotatably fit in vertical bore 40 and has an eccentrically positioned cylindrical projection 47 on its lower end in operable engagement with slot 46 in lock pin 11. Cam pin 12 has means adaptable to allow rotation thereof by a wrench, as a square or hexagonal projection or, as shown in this embodiment a hexagonal recess 48. A slightly tapered pin 50 is adapted to be received by horizontal mating bore 51 positioned in tool holder 2 so that pin 50 is engageable with an annular groove 49 in cam pin 12 to retain the cam pin in bore 40.

A tool bit 9 having a triangular cross section is slidably fitted in inclined recess 32 and vertically adjusted therein by means of an adjusting screw 52 passing upwardly in bore 34, said adjusting screw 52 being held in adjustment by detent pin 37. Cam pin 12 is then rotated so as to force lock pin 11 inwardly in horizontal bore 39 thereby increasing the holding force of the angled end portion 41 of spring clamp 10 on tool bit 9, as said angled end portion 41 fits over and directly against one face of tool bit 9 in inclined recess 32. Tapered pin 50 is then inserted in bore 51 to retain cam pin 12 in bore 40.

After a tool bit 9 has been clamped in place, the tool holder 2 is ready to be positioned and securely fastened to tool holder bearing plate 3. One bolt 17 is inserted in each of the elongated slots 16 and partially threaded into nuts 19 slidably and nonrotatably fitted in adjacent T-slots 13 and 14, so as to allow free movement of tool holders 2. From the above description it is evident that each tool holder 2 may have a universal movement composed of one or more of the following: a longitudinal movement as a result of shifting the tool holder 2 and bolts 17 along T-slots 13 and 14, a generally lateral movement by shifting the tool holder 2 towards or away from a workpiece with respect to the bolts 17, as illustrated by the dotted lines in Fig. 2, and a pivotal movement about any point as center on the longitudinal axis of tool holder slots 16. Thus, it is apparent that a plurality of tool holders 2 may be arranged in any desired grouping or angular relation for a cutting operation, as in Fig. 1.

After the tool holder 2 has been properly positioned, bolts 17 are tightened in nuts 19 thereby securely fastening tool holder 2 to plate 3. For further lateral support, side stops 7 may be positioned and tightened to plate 3 by bolts 21 and nut members fitted in T-slots 13 and 14.

Backstops 6 may also be positioned and tightened to plate 3 by bolts 25 and nuts 27 fitted in T-slot 15 with screws 29 being adjusted for direct engagement with the corresponding ends of tool holders 2 for further holding action.

Thus, it may be seen that any one tool holder 2 in any cutting arrangement may be conveniently repositioned by loosening a few bolts without disturbing the setting of other tool holders 2 in the arrangement.

I claim:

1. Tooling for a lathe comprising, a tool holder bearing plate adapted to be fixedly attached to the cross-slide of a lathe, having formed in the top surface thereof three parallel T-slots adapted to extend parallel to the axis of a workpiece mounted in the lathe, a plurality of tool holders of rectangular cross-section each having a cutting tool fastened to one end, each of said holders having means defining two spaced long and narrow slots extending the entire depth of the holder and for a major portion of the length of said holder, bolts in said tool holder slots, the threaded ends of said bolts being received by T-shaped nuts slidably fitted into two adjacent T-slots, said tool holders being capable of arrangement in any grouping or angular relation transversely to said parallel T-slots, L-shaped back stop members having bolts engageable with T-shaped nuts slidably fitted in the third T-slot and each having an adjusting screw engageable with a corresponding tool holder to aid in holding said tool holder in the desired position, and side stop members secured to said tool holder plate and in direct engagement with sides of said tool holders for further lateral support thereof.

2. Tooling for a lathe comprising, a tool holder bearing plate adapted to be fastened to the cross-slide of a lathe, said plate having a T-slot extending parallel to the axis of a workpiece mounted in the lathe, a tool holder supported on said plate adjustably carrying a tool bit at one end thereof and having an elongated, vertical slot therein extending approximately one-half the length of the holder, releasable fastening means passed downwardly through said vertical slot and in engagement with a nut slidably fitted in said T-slot so as to allow pivotal, lateral and longitudinal movement of said tool holder when said fastening means is in a released condition, said fastening means having a portion engageable with the upper surface of said tool holder, stop members adapted to be positioned on said plate adjacent said holder to provide additional lateral support thereof, and means for securing said stop members to said plate.

3. Tooling for a lathe comprising, a tool holder bearing plate adapted to be fastened to the cross-slide of a lathe and having a series of T-slots, said slots being parallel to each other and to the axis of a workpiece mounted in the lathe, and a plurality of tool holders supported on said plate each having a tool bit at one end and means therein defining two horizontally elongated, vertical slots, each vertical slot being adapted to receive a bolt having a head engageable with the upper surface of the tool holder and a threaded end engageable with a nut slidably and nonrotatably fitted in one of two adjacent T-slots so that each of said tool holders when in a released condition has a longitudinal movement along said T-slots, a lateral movement transversely of said T-slots and a pivotal movement about any point on the horizontal axis of said tool holder slots, thus allowing positioning of said plurality of tool holders in any angular relation or spacial grouping.

References Cited in the file of this patent

UNITED STATES PATENTS

| | | |
|---|---|---|
| 446,074 | Myers | Feb. 10, 1891 |
| 707,472 | Welter et al. | Aug. 19, 1902 |
| 948,698 | Hanson | Feb. 8, 1910 |
| 1,151,737 | Thomas | Aug. 31, 1915 |
| 2,289,155 | Weidance | July 7, 1942 |
| 2,363,160 | Sundstrom | Nov. 21, 1944 |
| 2,369,014 | Bruns | Feb. 6, 1945 |
| 2,408,891 | Steiner | Oct. 6, 1946 |
| 2,422,983 | Ramsey | June 24, 1947 |
| 2,624,103 | Bader | Jan. 6, 1953 |
| 2,659,962 | Doerseln | Nov. 24, 1953 |
| 2,669,149 | Watson | Feb. 16, 1954 |

FOREIGN PATENTS

| | | |
|---|---|---|
| 13,704 | Great Britain | June 11, 1909 |